Patented Apr. 6, 1937

2,076,130

UNITED STATES PATENT OFFICE 2,076,130

PROCESS OF MANUFACTURING POLYVINYL DERIVATIVES CONTAINING NITROGEN

Herbert Rein, Leipzig, Germany, assignor to I. G. Farbenindustrie Aktiengesellschaft, Frankfort-on-the-Main, Germany No Drawing. Application August 19, 1935, Serial No. 36,935. In Germany August 21, 1934

4 Claims. (Cl. 260—2)

My present invention relates to the manufacture of polyvinyl derivatives containing nitrogen.

One of its objects is a process for manufacturing polyvinyl derivatives containing nitrogen. Further objects will be seen from the detailed specification following hereafter.

I have found that highly polymeric compounds containing nitrogen can be obtained by causing a polyvinyl alcoholate to react with cyanogen halide whereby a halide salt is split off. According to the conditions of reaction selected there are obtained products whose nitrogen content may amount to 0.1 per cent and less up to 6 per cent. and more. The higher contents of nitrogen are obtained by the application of a higher reaction temperature and/or duration of the reaction. The reaction is preferably carried out between 0° and 55° C. and the temperature may be raised further after the chief reaction is over. However, the invention is not limited to the aforesaid interval of temperature. The cyanogen halide may also be applied in gaseous form. The constitution of the polymeric products is not known. They are of resinous character and do not possess a definite melting point. The products may be used as additions in the manufacture of artificial materials, artificial fibers and the like, for varying the affinity of these bodies to dyestuffs. The compounds may be added to the spinning solution during its preparation or they may be incorporated in the finished fibers.

The following examples illustrate the invention:

Example 1

13 kilos of polyvinyl alcoholate, made by kneading polyvinyl alcohol with the theoretical proportion of caustic soda lye of 20 per cent strength necessary for the formation of the alcoholate, are introduced gradually while stirring, at 0° C. into a solution of 10 kilos of cyanogen bromide in 500 liters of xylene with addition of 2.5 kilos of anhydrous sodium acetate. After 3 hours the temperature is allowed to rise gradually to 20° C. and the product thus obtained is filtered after a further 6 hours. Nitrogen content 3.9 per cent.

Example 2

9 kilos of polyvinyl alcohol are, kneaded with 30 liters of caustic soda lye of 20 per cent. strength and the mixture is introduced into 200 liters of a solution of 10 per cent strength of cyanogen bromide in benzene. After stirring for some hours the temperature is allowed to rise and the mass is further heated for a short time at 75° C. The filtered finished product contains 6.2 per cent of nitrogen.

What I claim is:

1. A process of producing polyvinyl derivatives containing nitrogen which comprises causing cyanogen halide to react with a polyvinyl alcoholate.

2. A process of producing polyvinyl derivatives containing nitrogen which comprises causing cyanogen halide to react with a polyvinyl alcoholate at a temperature between 0° and 55° C.

3. A process of producing polyvinyl derivatives containing nitrogen which comprises kneading polyvinyl alcohol with the theoretical portion of a 20% solution of caustic soda necessary for the formation of the alcoholate, cooling the solution to 0° C., introducing gradually while stirring cyanogen bromide dissolved in xylene with addition of anhydrous sodium acetate, allowing the temperature to rise to 20° C. after three hours, and filtering the product thus obtained after a further six hours.

4. A process of producing polyvinyl derivatives containing nitrogen which comprises kneading 9 kilos of polyvinyl alcohol with 30 liters of a 20 per cent caustic soda solution, introducing the mixture into 200 liters of a solution of 10 per cent strength of cyanogen bromide in benzene, stirring the mass thus obtained for some hours while allowing the temperature to rise, heating the mass for a short time at 75° C., and filtering the finished product.

HERBERT REIN.